Sept. 1, 1970

C. E. GRAF 3,526,819

CURRENT LIMIT FOR MOTOR CONTROL SYSTEMS

Filed Sept. 29, 1967

INVENTOR
CARLTON E. GRAF
BY Edward N. Goebel
HIS ATTORNEY

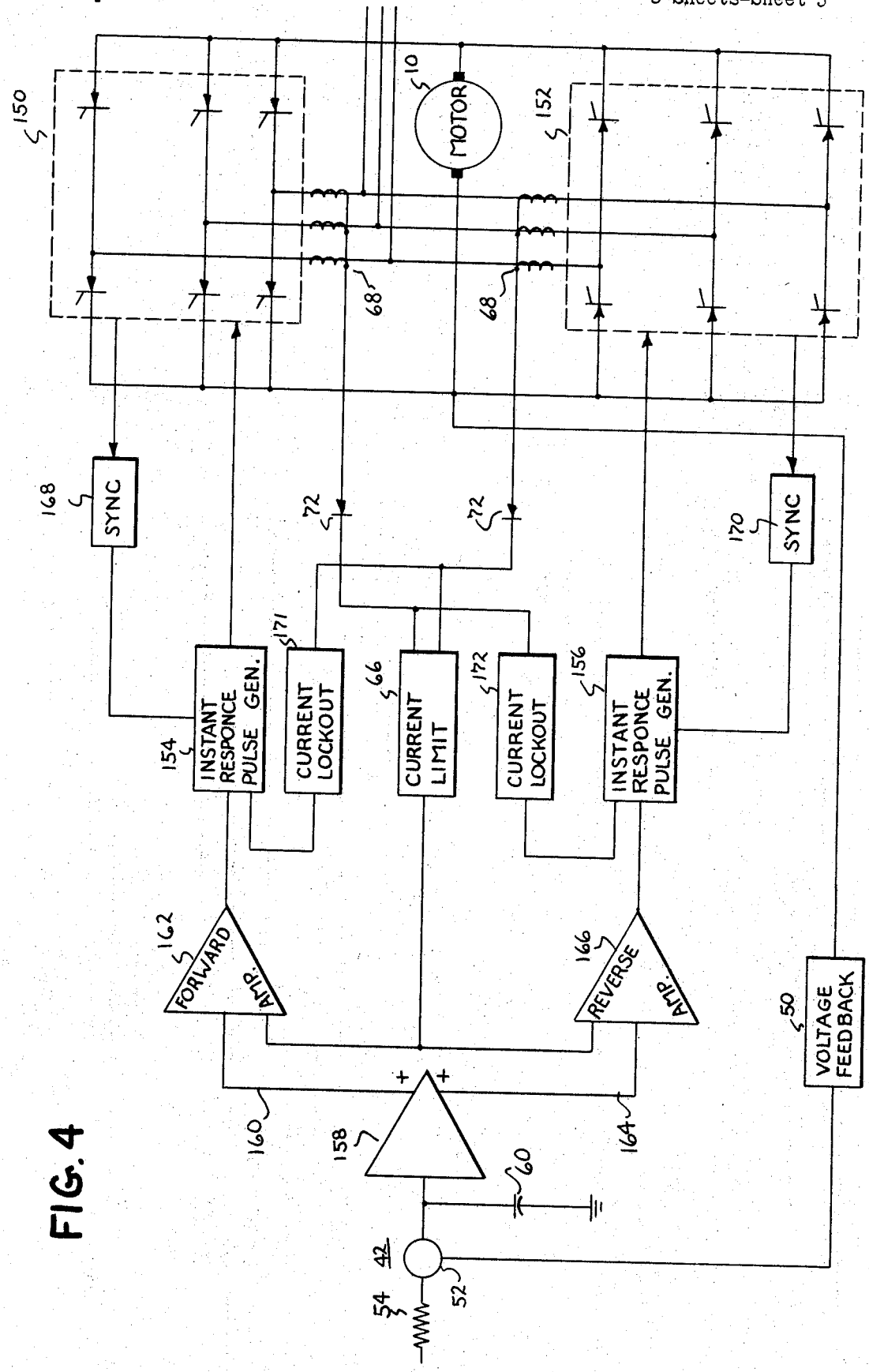

United States Patent Office 3,526,819
Patented Sept. 1, 1970

3,526,819
CURRENT LIMIT FOR MOTOR CONTROL SYSTEMS
Carlton E. Graf, Erie, Pa., assignor to General Electric Company, a corporation of New York
Filed Sept. 29, 1967, Ser. No. 671,775
Int. Cl. H02p 5/06
U.S. Cl. 318—341                                 9 Claims

ABSTRACT OF THE DISCLOSURE

A current limiting circuit for a motor control system wherein the time constant of an armature circuit aids in limiting the average armature current produced by a phase controlled power amplifier. The current limit circuit prevents controlled rectifiers in the power amplifier from being fired as long as the instantaneous value of the armature current is above a predetermined level. An amplifier within a regulating loop of the motor control system is activated as soon as the instantaneous value of the armature current decreases below the predetermined level, immediately firing a controlled rectifier which would have been fired but for the operation of a current limit circuit.

BACKGROUND OF THE INVENTION

This invention relates to motor control systems, and more particularly, to motor control systems using phase controlled power amplifiers for applying electrical energy from an alternating-current source to a drive motor.

While not limited to any one application, this invention is particularly useful in motor control systems having phase controlled power amplifiers for applying three-phase, full-wave rectified electrical energy to direct-current drive motors. The amount of energy supplied to a drive motor is varied by changing the firing angle of controlled rectifiers contained in these power amplifiers. The term "controlled rectifier" stands for devices which present a relatively high blocking impedance until a point of breakdown, at which point they conduct current through a relatively low impedance. Firing signals applied to gate or control electrodes of these controlled rectifiers can be used to determine the point of breakdown. Examples of controlled rectifiers are thyristors including silicon controlled rectifiers, ignitrons and similar tubes, and magnetic devices such as saturable reactors.

When the firing of these controlled rectifiers is retarded until late in a half-cycle of the applied A-C voltage, a small amount of energy is supplied to the motor. The amount of energy supplied to the motor is increased by advancing the firing of the controlled rectifiers.

In many conventional motor control systems of this type the average current which flows through the controlled rectifiers is controlled by a current regulator, a closed loop system which holds the current at a selected level. Since changes in the armature current are affected by the time constants of the motor and by the time constants of the load of the motor, the closed loop of the current regulator includes these and must be stabilized by means of devices having compensating time constants.

Furthermore, it is often necessary to filter current feedback signals when current regulators are used in phase controlled systems where an appreciable ripple component is present in the resulting D-C current. This adds the time constant of the filter to the time constant of the current regulator.

While these time constants pose no problem for many types of motor control systems, others, particularly those using fast acting controlled rectifiers, such as thyristors, find it is necessary to limit the current supplied to controlled motors at an equally high speed to prevent damage to the systems. When the current regulators described above are used to directly control the generation of firing pulses for the controlled rectifiers, their time constants reduce the responsive of the motor control system to over-current conditions or otherwise delay in limiting the current flowing to the controlled motors.

This invention was found to be particularly advantageous in a reversible motor control system using a three-phase, rectified power conversion system which can be operated in a regenerative manner. It was found that a conventional current regulator was too slow to eliminate a pause in the operation of the motor control system when the direction of current flow in the motor was required to be changed.

Therefore, it is an object of this invention to provide a motor control system having a stable current limit circuit which is immediately responsive to over-current and under-current conditions.

It is another object of this invention to provide a motor control system having a current limit circuit which operates without a time constant to provide stable limitation of the average armature current.

It is still another object of this invention to provide a motor control system in which the average current flowing through the armature of a direct-current motor during current limit is a function of the time constant of the armature circuit.

SUMMARY OF THE INVENTION

Briefly stated, and in accordance with one aspect of this invention, the motor control system of this invention includes a phase controlled power amplifier having controlled rectifier means for applying electrical energy from an alternating-current source to a drive motor. When the instantaneous value of the armature current increases above a predetermined level, a current limit circuit of the motor control system immediately prevents any of the controlled rectifiers from being fired. A forward biased controlled rectifier which would have been fired but for the operation of the current limit circuit can be fired immediately when the instantaneous value of the armature current decreases below the predetermined level so that the time constant of the armature circuit is effective in determining the average value of the armature current.

The novel features of this invention are set forth with particularity in the appended claims. The organization and manner of operation of the invention, together with further objects and advantages thereof, may be best understood by referring to the following description, taken in conjunction with the accompanying drawings.

BRIEF DESCRIPTION OF DRAWINGS

FIG. 4 shows a portion of a reversible motor control system using this invention.

Referring now in more detail to the drawings, FIG. 1 shows a block diagram of a motor control system having a fast acting current limit circuit which responds to the instantaneous value of the armature current, that is, to the actual value of this current at a given point in time, in accordance with the principles of this invention. This system includes a drive motor such as direct-current motor 10 which is energized by a phase controlled power amplifier 12 through conductors 14 and 16, with the motor 10 driving a load 18 through coupling means 20.

Figure 1:
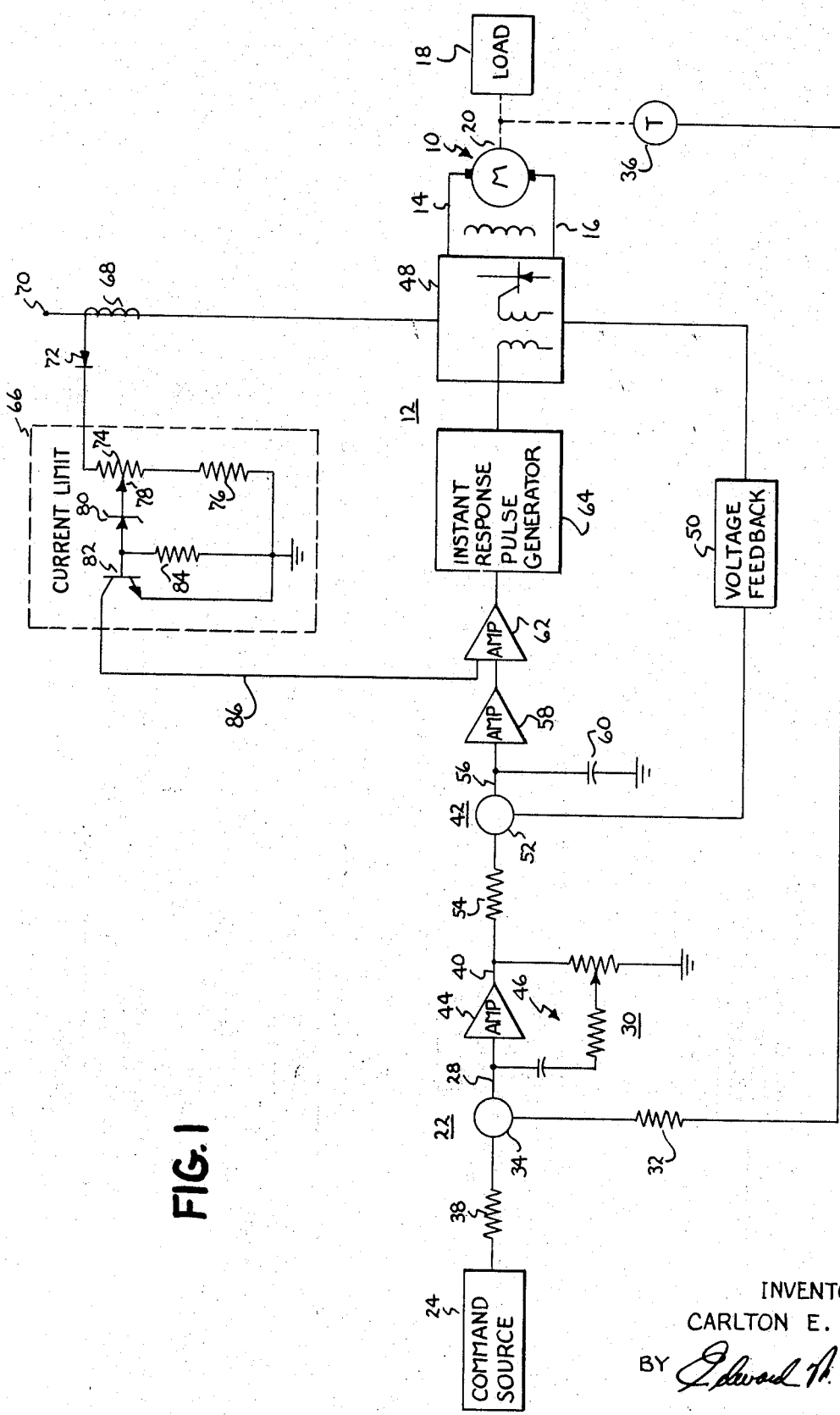
FIG. 1 is a block diagram of a motor control system made in accordance with the principles of this invention.

The overall performance of the drive motor 10 is controlled by means of a regulator 22 which compares reference signals from a command source and feedback signals from a feedback network 26 to produce error signal at a conductor 28 at the input of an operational amplifier 30. The command source 24 may comprise any convenient means for generating reference signals having a magnitude proportional to the desired performance of the drive motor 10. For example, it may comprise a regulated power supply, a computer, a tachometer generator driven by a master drive system, etc. The reference signals themselves may be reversible in polarity or may have a signal polarity, depending on the desired operation of the controlled motor.

Negative feedback signals, proportional to the regulated output of the drive motor 10, are coupled through a feedback resistor 32 to a summation point 34 of the regulator 22. For illustrative purposes, the regulated characteristic of the motor 10 is motor speed, and thus the feedback loop 26 includes a tachometer generator 36 coupled to the drive motor 10 to generate direct-current signals proportional to the speed of the motor 10. As an alternative, the regulated quantity may be the torque produced by the motor 10, the position of the load 18, etc., in each instance requiring an appropriate feedback signal.

The differencee between the current flow through the resistor 32, caused by the feedback signal, and the current flow through a resistor 38, caused by the reference signal, produces an error signal at the summation point 34 and the conductor 28. In accordance with conventional servo theory, this error signal is used to control the performance of the drive motor 10 by contributing to the production of actuating signals for the power amplifier 12. The error signal itself is amplified by the amplifier 30 to produce a signal at a conductor 40 which itself is used as a reference signal for a regulator 42.

The operational amplifier 30 comprises an amplifier circuit 44 having an adjustable feedback network 46 connected thereacross. The network 46 responds to high frequency error signals which occur due to transient operating conditions of the drive system, smoothing out these signals to stabilize the system.

The regulator 42 is a voltage regulator which quickly responds to the need for changing the firing phase angle of the controlled rectifiers in a power conversion module 48 of the power amplifier 12. This regulator comprises a voltage feedback network 50 for providing feedback signals to a summation point 52. The actuating signals at the conductor 40 are coupled through a resistor 54 to the summation point 52, where they are compared with the feedback signals to produce an error signal at the conductor 56. The regulator 42 is stabilized by means of a capacitor 60 connected between the conductor 56 at the input of an amplifier 58 and a common point of the motor control system.

The output from the amplifier 58 is coupled through another amplifier 62 to an instantaneously responsive pulse generator 64, the output of which is used to fire the controlled rectifiers in the power conversion module 48.

In accordance with the principles of this invention, a current limit circuit 66 is provided which, in conjunction with other portions of this motor control system, provides a fast acting control of the average value of the current at the armature circuit of the motor 10. The current limit circuit 66 comprises means for sensing the instantaneous value of the armature current in the motor 10 and for determining when the instantaneous value of this current is above a predetermined level and when it falls below this level. For illustrative purposes, this means includes a transformer 68 having an output proportional to the current supplied from an alternating-current source to a terminal 70. The output from the transformer 68 is coupled through the rectifier 72 and to a voltage divider comprising a potentiometer 74 and a resistor 76. The slide wire 78 of the potentiometer 74 is connected through a breakdown voltage device such as Zener diode 80 to the base electrode of a transistor 82. A resistor 84 is connected across the base and emitter electrode of the transistor 82. When the voltage at the slide wire 78 reaches the breakdown level of the Zener diode 80, the transistor 82 is turned on. The transistor 82 is turned off as soon as voltage decreases below the breakdown level again.

Means are provided for preventing any of the controlled rectifiers of the conversion module 48 from being fired while the instantaneous value of the armature current remains above a predetermined level, the level being determined by the Zener diode 80 and the position of the slide wire 78. To this end, the collector electrode of the transistor 82 is coupled through a conductor 86 to an input of the amplifier 62. The transistor 82 acts as a switch which, in response to an instantaneous current value above the predetermined level, turns off the amplifier 62, over-riding the effects of the output of the regulator 42. Significantly, the amplifier 62 is without a stabilizing circuit or any circuit component which might delay the effects which turning on and turning off the transistor 82 have on the firing of the controlled rectifiers of the conversion module 48. Furthermore, the output of the amplifier 62 is coupled to a pulse generator of the type which can immediately discontinue the firing of additional controlled rectifiers in the conversion module 48 when the current limit circuit 66 is actuated. Once the transistor 82 is turned off, the pulse generator 64 can just as quickly fire those forward biased controlled rectifiers which would have been fired but for the operation of the current limit circuit 66.

Neither the current limit circuit 66 nor the other portions of the motor control system between the conductor 86 and the controlled rectifiers of the conversion module 48 should have a time delay which would prevent the system from resuming its normal operation once the instantaneous value of the armature current decreases below the predetermined level. For this reason, as will be explained below, the output from the amplifier 62 is not applied across a timing capacitor in the pulse generator 64.

OPERATION OF FIG. 1

Figure 2:
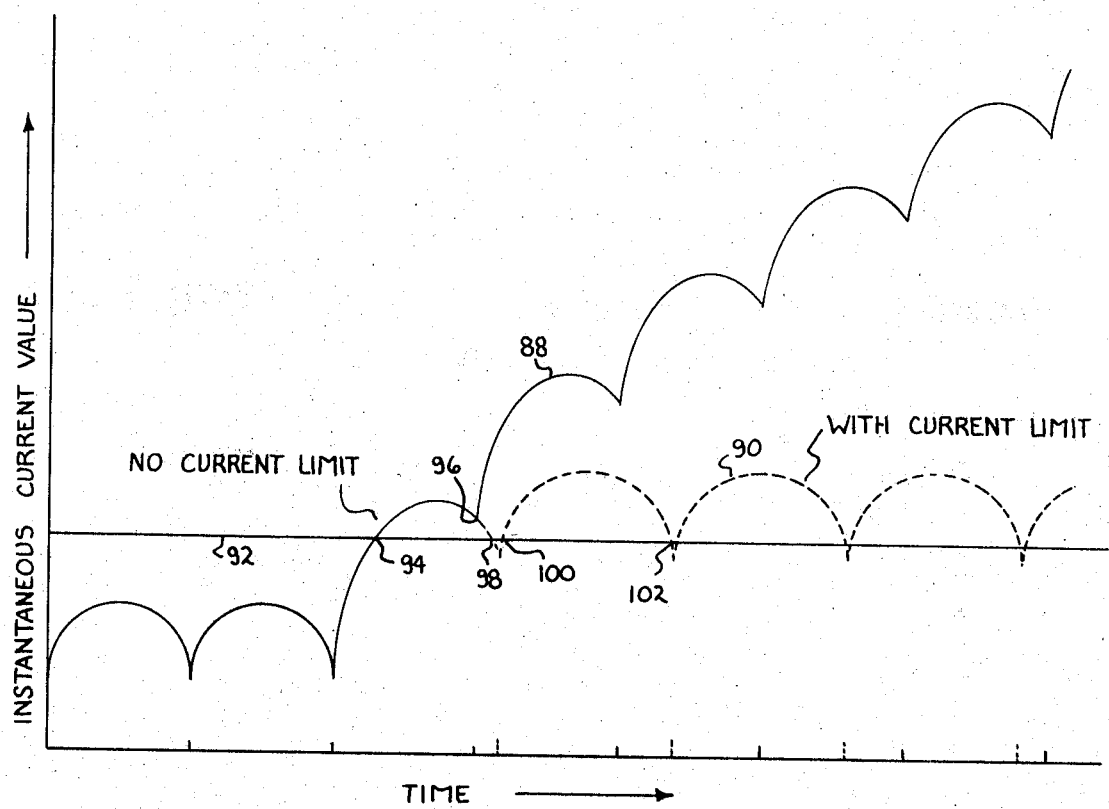
FIG. 2 is a graph showing the effects of the current limit circuit on the armature current of the controlled motor.

The operation of the motor control system of FIG. 1 will be best understood by referring to FIG. 2 along with FIG. 1. The armature current is measured in amperes along the ordinate of the graph shown in FIG. 2, while time is measured along the abscissa of this graph. The solid line 88 represents the instantaneous value of the armature current when the current limit features of motor control systems in FIG. 1 are not in operation. The dotted line 90 shows the instantaneous value of the armature current when current limit is effective. The vertical lines shown periodically on the abscissa correspond to the times when controlled rectifiers of the conversion module 48 are fired during the operation of the motor control system of FIG. 1. The solid lines show the firing times of the controlled rectifiers when the current limiting features of this invention are not in operation, and the dotted lines show the firing times during current limit. The solid line 92 is drawn at the predetermined current level at which the current limit features of this invention become effective.

During the operation of the control system shown in FIG. 1, the regulator 22 controls the speed of the motor 10 by providing error signals at the conductor 28 which are proportional to the difference between the command signal from the command source 24 and the feedback signals from the tachometer 36. These error signals amplified by the operational amplifier 30, aid in providing actuating signals to the power amplifier 12. The regulator 42 compares the output from the amplifier 30 with the voltage feedback signals to provide an output which, when amplified by the amplifier 62, is applied to the pulse generator 64 to control the phase angle at which the controlled rectifiers of the conversion module 48 are fired.

During the normal operation of this motor control system, the value of the current flowing through the armature of the motor 10 remains below the predetermined current level indicated by the line 92 in FIG. 2. However, at a time when the load is changing or the motor speed is required to increase, the armature current level can increase substantially to a value which can damage the controlled rectifiers or the motor itself. In FIG. 2, the portion of the solid curve 88 above the line 92 shows the manner in which the current can increase in these instances if it is not controlled.

However, in accordance with this invention, whenever the instantaneous current value increases above the predetermined level indicated by the line 92, the Zener diode 80 breaks down to turn on the transistor 82. Simultaneously, the amplifier 62 is turned off to remove the voltage which controls the generation of firing pulses from the pulse generator 64. While the amplifier 62 is turned off, none of the non-conducting controlled rectifiers can be fired. Referring to FIG. 2, the transistor 82 is turned on, and the amplifier 62 turned off, at a point 94 at the junction of the lines 88 and 92.

Had the current limit circuit 66 not been actuated, another controlled rectifier would have been fired at a point 96 on the line 88, causing additional voltage to be applied to the armature of the motor 10 with a resulting increase in the armature current. Since this controlled rectifier was not fired, armature current continues to decrease beyond the point 96, beginning to follow the dotted line 90. Immediately when the instantaneous value of the armature current decreases below the predetermined level, a forward biased controlled rectifier which would have been fired but for the operation of the current limit circuit 66 is fired. Thus, the controlled rectifier which was not fired at the point 96 is now fired at a point 98, where the dotted line 90 crosses the line 92. Voltage is now applied from the source to the armature of the motor 10, causing the instantaneous current value to increase once again above the predetermined level, as at a point 100 on the line 90. The firing of the controlle rectifiers is again held off until the instantaneous current value decreases below this level, at which time they are immediately fired, as at a point 102 where the dotted line 90 crosses the line 92.

The ripple component of the armature current, along with the magnitude of the applied A-C voltage, determine the maximum height of the current and the time at which the instantaneous value of the current decreases below the predetermined level. If the ripple component of the current changes, the shape of the current pulses change, along with the points at which the instantaneous value of the current crosses the predetermined level. The average value of the armature current changes as well, even though the predetermined current level shown by the line 92 of FIG. 2 is not changed. In practice, this predetermined current level is determined after the actual drive motor 10 has been selected for the motor control system. At this time the effects of the ripple component on the average armature during current limit can be estimated. This invention is particularly advantageous for motor control systems having a continuous current above the predetermined level during current limits. For systems having a discontinuous current at this time, some modification might be necessary to prevent the controlled rectifiers from being misfired at the end of current limit.

It is an important feature of this invention that the circuits between the current limit circuit 66 and the power conversion module 48 have the ability to respond immediately to a requirement to prevent any of the controlled rectifiers from being fired due to the armature current level and also have the ability to respond immediately to conditions which allow the firing of the controlled rectifiers to take place. As stated above, the amplifier 62 has no time constant. The pulse generator 64 must have the ability to instantaneously respond to changes in the signal level at the output of amplifier 62. While any type of pulse generator circuit having this ability is satisfactory for this invention, for economic reasons it is often desirable to use transistorized circuits, such as those utilizing unijunction tranistors, to control the phase angle at which controlled rectifiers are fired. A circuit of this type which is highly satisfactory for this invention is disclosed and claimed in my co-pending patent application, Ser. No. 582,230, filed on Sept. 30, 1966, entitled "Time Delay Control Circuit," which is intended to be incorporated herein by reference. One embodiment of this circuit is shown in FIG. 3 for illustrative purposes.

Figure 3:
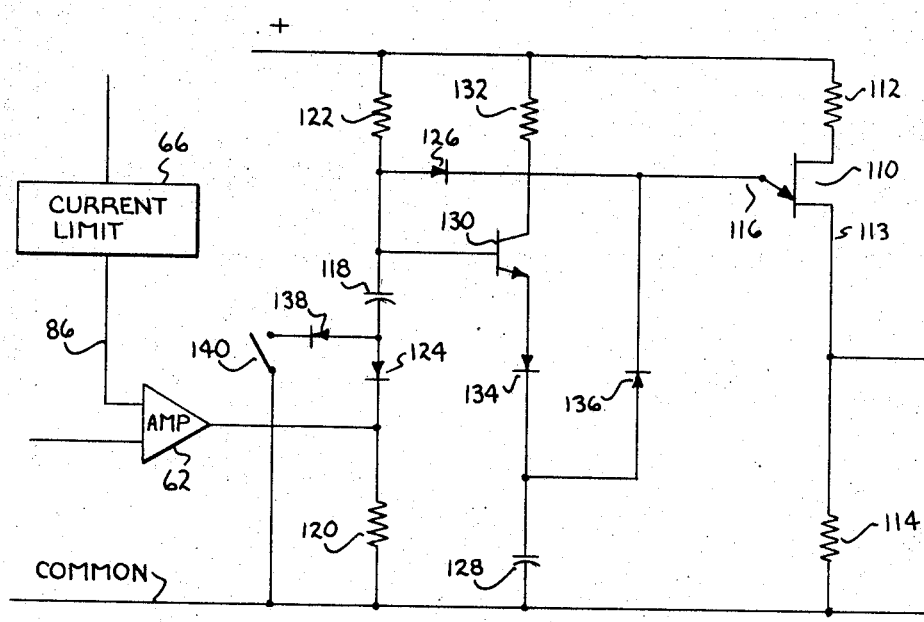
FIG. 3 is a schematic diagram of a portion of a pulse generator which can be used in accordance with this invention.

The phase control circuit shown in FIG. 3 comprises a unijunction transistor 110 having its base two electrode connected through a resistor 112 to a source of positive potential regulated voltage. The base one electrode of this transistor is connected through a resistor 114 to a common point such as ground. The unijunction transistor 110 is fired, decreasing the impedance between its base one electrode 113 and its emitter electrode 116, when the voltage across its emitter and base one electrodes is a certain percentage, called the intrinsic stand-off ratio of the voltage applied across the base two and base one electrodes. For example, if the intrinsic stand-off ratio of the unijunction transistor 110 is 60% and the voltage from the base two electrode to the base one electrode is 20 volts, the voltage across the emitter electrode 116 and the base one electrode 113 is 12 volts, the unijunction transistor 110 is fired. At this time an output signal is developed across the resistor 114, which causes one of the controlled rectifiers of the conversion module 48 of FIG. 1 to be fired.

In the present circuit, the unijunction transistor 110 is fired by a combination of a timing voltage, developed across a capacitor 118, and the control or platform voltage developed across a resistor 120 by the output of the amplifier 62. The timing voltage across the capacitor 118 is developed by current flowing from the positive voltage source, through a resistor 122, and through a diode 124 and the resistor 120 to the common terminal of the circuit. The sum of the voltages across the capacitor 118 and the resistor 120 is coupled through a diode 126 to the emitter electrode 116 of the unijunction transistor 110 and through the resistor 114 to the base one electrode 113, where this sum is compared with the voltage across the base two and base one electrodes of the transistor 110.

The combination of a capacitor 128 and a transistor 130 provides an auxiliary energy source which can be charged independently of the timing capacitor 118 without initiating the firing of unijunction transistor 110. The transistor 130 is connected in an emitter-follower configuration whereby the capacitor 128 is charged through this transistor, the resistor 132, and a diode 134 to a voltage level just below that developed across the capacitor 118 and the resistor 120. Thus, should the unijunction transistor 110 be turned on while there is only small charge across the capacitor 118, due to the large platform voltage across the resistor 120, the capacitor 128 can be discharged through a diode 136 to assure that the firing pulses are developed across the resistor 114.

Among the advantages of using a phase controlled circuit, such as that shown in FIG. 3 to provide firing pulses, is the fact that changes in the output from the amplifier 62 immediately raise or lower the voltage across the emitter and base one electrodes 116 and 113. The output from the amplifier 62 need not charge a capacitor to become effective, as is the case with many conventional circuits. Furthermore, through the use of circuits such as a diode 138 and an appropriately controlled switch 140, the platform voltage from the amplifier 62 can be eliminated without appreciably changing the charging characteristics of the capacitor 118.

FIG. 4 shows a specific example of a motor control system in which the invention described with respect to FIG. 1 has been found to be particularly useful. Common circuit components are given the same numbers they had in FIG. 1. Some portions of the overall system have been left out of FIG. 4 to simplify the drawing. The various components of this system have been shown in block form to as great an extent as is practical to further clarify the drawings.

This motor control system includes a pair of three-phase, full-wave bridge rectifiers 150 and 152 containing thyristors such as silicon controlled rectifiers for converting the alternating-current voltage to direct-current voltage which is applied to the armature of the motor 10. This motor control system is reversible and has a regenerative mode of operation.

One of the pair of bridge circuits carries current which flows through the motor armature in one directon, while the other carries current which flows through the armature in the opposite direction. For example, the bridge rectifier 150 carries current both while the motor is receiving power from the alternating-current source as the armature rotates in the forward direction and while the motor is operatin g in its regenerative mode, returning power back to the source, as the armature rotates in the reverse direction. The bridge rectifier 152, on the other hand, carries current both while the motor is receiving power from the source as the armature rotates in the reverse direction and while the motor is returning power back to the source as the armature rotates in the forward direction.

It is particularly advantageous to have the voltage regulator 42 directly control the generation of firing pulses by a pair of pulse generators 154 and 156 in the system shown in FIG. 4. This voltage regulator is not subject to time delays such as those caused by the time constant of the motor 10 which might prevent its quick response to required changes in the phase angles at which the controlled rectifiers are fired.

The output from the regulator 42 is coupled through a differential amplifier 158 which, when its error input is positive in polarity, provides signals through a conductor 160 and through a forward amplifier 162 to the pulse generator 154. At this time, the output from the differential amplifier 158 controls the firing of the controlled rectifiers of the bridge rectifier 150, say as this bridge rectifier supplies power to the motor 10 while it rotates in the forward direction. When the error input to the differential amplifier 158 is negative in polarity, the signals are coupled through a conductor 164 and an amplifier 166 to the pulse generator 156. At this time, the output of the differential amplifier 158 controls the firing of the controlled rectifiers of the bridge circuit 152. Circuits 168 and 170 synchronize the generation of firing pulses for the controlled rectifiers with the three phase voltages which bias these controlled rectifiers in the bridge circuits 150 and 152, respectively.

Lockout circuits 171 and 172 respond to the current flow through the bridge circuits 152 and 150, respectively, to prevent current from beginning to flow through one of these bridge circuits while it is still flowing through the other. For example, while the motor 10 is rotating in the forward direction and a regenerative mode of operation is required, the current must be switched from the bridge rectifier 150 to the bridge rectifier 152 as its direction of flow reverses. The lockout circuit 172 prevents the controlled rectifiers in the bridge circuit 152 from being fired while current is still flowing through the controlled rectifiers in the bridge circuit 150, preventing the chance of a simultaneous firing of controlled rectifiers in the two bridge rectifiers which would produce an alternating-current short circuit.

The current limit circuit 66 of this invention provides a relatively inexpensive means for controlling the armature current level in a system of the type shown in FIG. 4. The immediate response capabilities of this circuit and those of the various system components, such as the amplifiers 162 and 166 and the pulse generators 154 and 156, connected between it and the controlled rectifiers provide an effective control of the armature current throughout the range of operation of this system.

This invention is not limited to the particular details of the preferred embodiments illustrated. It is contemplated that many variations, modifications and applications of this invention will occur to those skilled in the art. It is, therefore, intended that the appended claims cover those variations, modifications and applications which do not depart from the true spirit and scope of this invention.

What I claim as new and desire to secure by Letters Patent of the United States is:

1. A motor control system comprising, in combination:
   (a) drive motor means;
   (b) phase controlled power amplifier means including controlled rectifier means for applying electrical energy from an alternating-current source to said drive motor;
   (c) first means for applying actuating signals to said power amplifier, said first means including regulator means which combines reference signals from a command source and feedback signals which vary as a function of a regulated parameter of said system from a feedback network to aid in producing the actuating signals;
   (d) said power amplifier means including second means responsive to the actuating signals for providing firing signals to said controlled rectifier means; and
   (e) said power amplifier means also including current limit circuit means for responding immediately to an increase in the instantaneous value of the armature current of said drive motor above a predetermined level to prevent any of said controlled rectifier means from being fired while the armature current remains above the predetermined level, said second means and said current limit circuit causing controlled rectifier means which would have been fired but for the operation of said current limit circuit to be fired immediately when the instantaneous value of the armature current decreases below the predetermined level so that the average value of the arrmature current during the current limit is a function of the time constant of the armature circuit.

2. A motor control system according to claim 1 in which said current limit circuit is connected to a point in said power amplifier having no time constant between it and said controlled rectifier means.

3. A motor control system according to claim 1 which includes a first regulator for combining reference signals from a commond source and feedback signals proportional to the regulated parameter of said system to produce first actuating signals; a second regulator for combining the first actuating signals and signals proportional to the voltage developed across the armature of said drive motor means to produce the second actuating signals, with said second means responding to the second actuating signals; and means for connecting said current limit circuit between said second regulator and said controlled rectifier means so that there is no appreciable time delay in the response of the motor control system to said current limit circuit.

4. A motor control system comprsing, in combination:
   (a) direct-current drive motor means;
   (b) phase controlled power amplifier means including a first set of controlled rectifier means for causing electric current to flow from a three-phase, alternating-current source and through said drive motor in a first direction and a second set of controlled rectifier means for causing electric current to flow from the three-phase source and through said drive motor in the opposite direction;

(c) means for controlling the firing of said controlled rectifier means in response to a chosen parameter of said system including a voltage regulator for combining signals representative of the desired performance of said drive motor and voltage feedback signals from said drive motor to produce error signals for controlling the generation of firing pulses for said controlled rectifier means; and (d) current limit circuit means connected between said voltage regulator and said controlled rectifier means for providing an immediate response to an increase in the instantaneous value of the armature current of said drive motor above a predetermined level to prevent any of said controlled rectifier means from being fired while the armature current remains above the predetermined level, said current limit circuit allowing a forward biased controlled rectifier means which would have been fired but for the operation of said current limit circuit to be fired immediately when the instantaneous value of the armature current decreases below the predetermined level.

5. A motor control system according to claim 4 wherein said voltage regulator includes a differential amplifier and first and second firing pulse generators, said differential amplifier having a first output means connected to said first firing pulse generator for energizing said first set of controlled rectifiers and having a second output means connected to said second firing pulse generator for energizing said second set of controlled rectifiers; said motor control system also including means responsive to the current flow in said first and second sets of controlled rectifiers for preventing one of said sets of controlled rectifiers from beginning to conduct current until after the current has stopped flowing in the other of said sets.

6. A motor control system comprising, in combination:
(a) direct-current drive motor means;
(b) phase controlled power amplifier means including a first full-wave bridge circuit including controlled rectifiers for conducting electric current from a three-phase, alternating-current souce and through said drive motor in a first direction and a second full-wave bridge circuit including controlled rectifiers for conducting electric current from a three-phase, alternating-current source and through said drive motor in the opposite direction;
(c) means for controlling the firing of said controlled rectifiers including regulator means which combines reference signals from a command source and feedback signals, which vary as a function of a regulated parameter of said system, from a feedback network for producing first actuating signals and also including a voltage regulator which combines the first actuating signals and voltage feedback signals from said drive motor to produce error signals for controlling the generation of firing pulses for said controlled rectifier means;
(d) said voltage regulator including a differential amplifier having a first output for controlling the firing of controlled rectifiers in said first bridge circuit and a second output for controlling the firing of controlled rectifiers in said second bridge circuit;
(e) means responsive to the current flow in the controlled rectifiers of said first and second bridge circuits for preventing said controlled rectifiers of one of said bridge circuits from beginning to conduct current until current has stopped flowing in the controlled rectifiers of the other of said bridge circuits; and
(f) current limit circuit means connected between said voltage regulator and said controlled rectifiers for providing an immediate response to an increase in the instantaneous value of the armature current of said drive motor above a predetermined level to prevent any of said controlled rectifiers from being fired while the armature current remains above the predetermined level, the armature current being continuous while its instantaneous value is above the predetermined level, said current limit circuit allowing a forward biased controlled rectifier which would have been fired but for the operation of said current limit circuit to be fired immediately when the instantaneous value of the armature current decreases below the predetermined level.

7. A control system for controlling the power applied from an alternating source to an inductive load, said control system comprising phase controlled power amplifier means comprising controlled rectifier means for applying electrical energy from the source to the load, first means for applying actuating signals to said power amplifier, said first means including regulator means which combines reference signals from the command source and feedback signals which vary as a function of a regulated parameter of the load from a feedback network of said system to aid in producing the actuating signals, and said power amplifier means including second means responsive to the actuating signals for providing firing signals to said controlled rectifier means, wherein the improvement comprises:

current limit circuit means for responding immediately to an increase in the instantaneous value of the current flowing in the load when the current is above a predetermined level, said current limit circuit means preventing any of said controlled rectifier means from being fired while the armature current remains above the predetermined level, said second means and said current limit circuit causing controlled rectifier means which would have been fired but for the operation of said current limit circuit to be fired immediately when the instantaneous value of the armature current decreases below the predetermined level.

8. A control system according to claim 7 wherein said phase controlled power amplifier means includes first controlled rectifier means for causing electric current to flow from the alternating-current source and through the inductive load in a first direction and second controlled rectifier means for causing electric current to flow from the alternating-current source and through the inductive load in a second direction, said motor control system also including means responsive to the current flow in said first and second controlled rectifier means for preventing one of said first and second controlled rectifier means from beginning to conduct current until after current has stopped flowing in the other.

9. A control system according to claim 7 which includes a voltage regulator for combining reference signals from a command source and signals proportional to the voltage developed across the load to aid in producing the actuating signals and means for connecting said a current limit circuit between said voltage regulator and said controlled rectifier means so that there is no appreciable time delay in the reponse of the control system to said current limit circuit.

References Cited

UNITED STATES PATENTS

| | | | |
|---|---|---|---|
| 3,127,550 | 3/1964 | Gilbreath et al. | 318—331 |
| 3,214,667 | 10/1965 | Foster et al. | 318—331 |
| 3,252,069 | 5/1966 | Ringrose | 318—308 |
| 3,284,689 | 11/1966 | Rosa | 318—341 |
| 3,383,578 | 5/1968 | Lewis | 318—331 |
| 3,385,986 | 5/1968 | Smith | 318—308 |
| 3,411,063 | 11/1968 | Schoonover | 318—331 |
| 3,421,065 | 1/1969 | Stabile | 318—327 |
| 3,413,534 | 11/1968 | Stringer | 318—308 |
| 3,427,506 | 2/1969 | Thiele | 318—341 |

ORIS L. RADER, Primary Examiner

THOMAS LANGER, Assistant Examiner

U.S. Cl. X.R.

318—327, 332, 434